United States Patent [19]
Ranmuthu

[11] Patent Number: 6,060,872
[45] Date of Patent: May 9, 2000

[54] VOLTAGE BIAS CURRENT SENSE SINGLE ENDED PREAMPLIFIER WITH SECOND STAGE DOMINANT POLE

[75] Inventor: Indumini W. Ranmuthu, Plano, Tex.

[73] Assignee: Texas Instruments Incorporated, Dallas, Tex.

[21] Appl. No.: 09/215,084

[22] Filed: Dec. 18, 1998

[51] Int. Cl.[7] .................................................... G05F 3/16
[52] U.S. Cl. ................................................................ 323/316
[58] Field of Search .................................. 360/73.03, 69, 360/75; 323/3, 60

[56] References Cited

U.S. PATENT DOCUMENTS

| | | | |
|---|---|---|---|
| 4,639,798 | 1/1987 | Harrison et al. | 360/73.03 |
| 5,384,524 | 1/1995 | Romano | 318/569 |
| 5,822,153 | 10/1998 | Lairson et al. | |

*Primary Examiner*—Shawn Riley
*Attorney, Agent, or Firm*—W. Daniel Swayze, Jr.; Wade James Brady, III; Frederick J. Telecky, Jr.

[57] ABSTRACT

A circuit for maintaining a constant voltage across a head including a transconductance circuit to measure a difference voltage between a first voltage and a second voltage and to output a current based on the difference voltage, a first circuit to convert the current based on the difference voltage to a third voltage, and a second circuit to apply a portion of the third voltage to said head.

9 Claims, 2 Drawing Sheets

6,060,872

VOLTAGE BIAS CURRENT SENSE SINGLE ENDED PREAMPLIFIER WITH SECOND STAGE DOMINANT POLE

FIELD OF THE INVENTION

The present invention relates to disk circuits and more particularly to a method and apparatus for reading information from a magnetic disk.

BACKGROUND OF THE INVENTION

Conventional magnetic storage devices include a magnetic transducer or "head" suspended in close proximity to a recording medium; for example, a magnetic disk having a plurality of concentric tracks. The transducer is supported by an air-bearing slider mounted to a flexible suspension. The suspension, in turn, in attached to a positioning actuator. During normal operation, relative motion is provided between the head and the recording medium as the actuator dynamically positions the head over the desired track. The relative movement provides an air flow along the surface of the slider facing the medium, creating a lifting force. The lifting force is counterbalanced by a predetermined suspension load so that the slider is supported on a cushion of air. Air flow enters the "leading end" of the slider and exits from the "trailing end." This air is used to prevent the head from contacting the disk, resulting in damage.

Writing data is typically performed by applying a current to a coil of the head so that a magnetic field is induced in the adjacent magnetically permeable core, with the core transmitting a magnetic signal across any spacing and protective coating of the disk to magnetize a small pattern or digital bit of the media within the disk. Reading of the information in the disk is performed by sensing the change in magnetic field of the core as the transducer passes over the bits in the disk. The changing magnetic field induces a voltage or current in the inductively coupled coil. Alternatively, reading of the information may be accomplished by employing a magneto resistive (MR) sensor, which has a resistance that varies as a function of the magnetic field adjacent to the sensor. In order to increase the amplitude and resolution in reading the bits, the MR sensor is typically positioned on the slider as close to the disk as possible. Connected to these heads or sensors are read circuits which amplify the recorded data and eliminate noise. However, recently, some manufacturers of these MR sensors have switched from MR heads which employ a constant current source to MR heads which employ a constant voltage source. Consequently, there has developed a need for a read circuit which provides a constant voltage source instead of a constant current source. Thus, a constant voltage source would be desirable to be placed directly across the RMR.

SUMMARY OF THE INVENTION

The present invention provides a constant voltage source to the RMR which is the resistance of the magnetic head. The present invention implementation includes a transconductance device in connection with a capacitor through a feedback circuit to provide a constant voltage.

The present invention in an additional implementation uses a voltage DAC circuit's output connected to an input to a transistor to provide a constant voltage to an MR head. The present invention implementation voltage DAC circuit uses a circuit to generate a program voltage which is reflected through a series of elements to an MR head. A transconductance element is used in conjunction with a capacitor to maintain this voltage. This implementation can also use any other voltage DAC circuit, but the implementation provides a very accurate voltage across the head. Both invention implementations have second stage dominant poles, which allows amplification of read signal with constant voltage bias and establishes lower cutoff frequency response.

DETAILED DESCRIPTION OF THE PRESENT INVENTION

Figure 1:
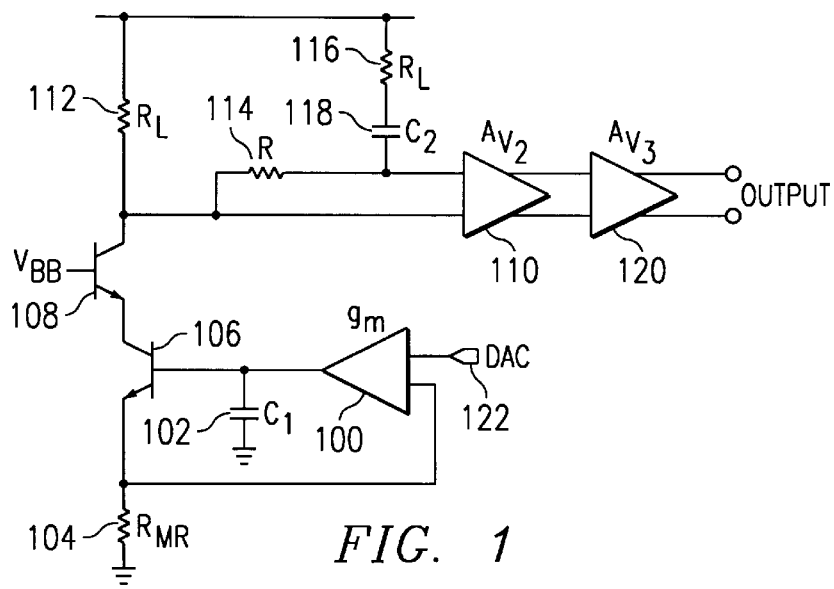
FIG. 1 illustrates a circuit of the present invention implementation.

Turning to FIG. 1, which shows a first implementation, a resistance 104 corresponds to the resistance RMR of a head; for example, a magnetic head. This resistance 104 is connected to the emitter of transistor 106. The base of transistor 106 is connected to one end of capacitor 102 and to the output of transconductance circuit 100. The collector of transistor 106 is connected to the emitter of transistor 108. The collector of transistor 108 is connected to the input of differential amplifier 110 and resistor 112. The base of transistor 108 is connected to $V_{BB}$. The other end of resistor 102 is connected to voltage $V_{CC}$. The collector of transistor 108 is connected to resistor 114 and to an input of differential amplifier 108. The other end of resistor 114 is connected to the other input of differential amplifier 108. This other end of resistor 114 is connected to capacitor 108 which is connected in series to resistor 116. The output of differential amplifier 110 is connected to differential amplifier 120. The differential amplifier 110 forms a second stage to establish a lower cutoff frequency; for example, 500 KHz, and the differential amplifier 120 is a third stage. The output of the differential amplifier 120 is the output of the read circuit.

The plus terminal of the transconductance 100 is connected to an output of a voltage DAC 122. The negative terminal or other input of transconductance circuit 110 is connected to the emitter of transistor 106. The transconductive element 100, capacitor 102 and transistor 106 form a feedback loop to maintain the voltage across resistance 104.

The output of transconductance circuit 100 is a current which flows to capacitor 102 to charge capacitor 102 to a voltage level. This voltage formed on capacitor 102 is applied to the base of transistor 106. Additionally, this voltage formed on capacitor 102 is applied through the base of transistor 106 to RMR resistor 104. The voltage applied to resistor 104 or RMR is voltage at C102-$V_{BE}$. This voltage provides a conduction path from the collector to the emitter of transistor 106. Transistor 106 operates in the operating range. The voltage input to transconductance circuit 100 is output from the voltage DAC circuit 122. The voltage output from the voltage DAC circuit 122 is adjustable and programmable. Changing this voltage changes the voltage across the capacitor 102, and in turn the voltage across RMR or resistance 104. If a difference in voltage occurs between the inputs of transconductance circuit 100, a current flows out of transconductance circuit 100 and forms an additional voltage on capacitor 102. This difference in voltage can be caused by an adjustment in the output voltage of voltage DAC circuit 122 or a voltage in the loop. A drop could be caused by a drop in the voltage across the RMR head. This raises the voltage across the base to emitter of transistor 106 which raises the voltage across the resistance 104. Thus, the voltage across the resistance of the magnetic head is raised. This voltage is input to the transconductance circuit 100 from the feedback loop and, consequently, when this voltage reaches the voltage from the voltage output from the voltage DAC circuit, the transconductance circuit 100 shuts off and does not output current. Thus, the feedback loop operates to maintain the voltage across the resistance 104. The transistor 108 operates as a cascode transistor for transistor 106 and amplifies the signal out of the MR head. This voltage is input to the differential amplifier 110. The capacitor 118 operates as an open circuit for relatively low frequencies; for example, less than 500 cycles, and consequently voltage is not amplified through the differential amplifier 110 since it is a common mode input. However, as the frequency rises, the capacitor 118 operates as a short circuit, and a differential voltage is formed across differential amplifier 110.

Figure 2:
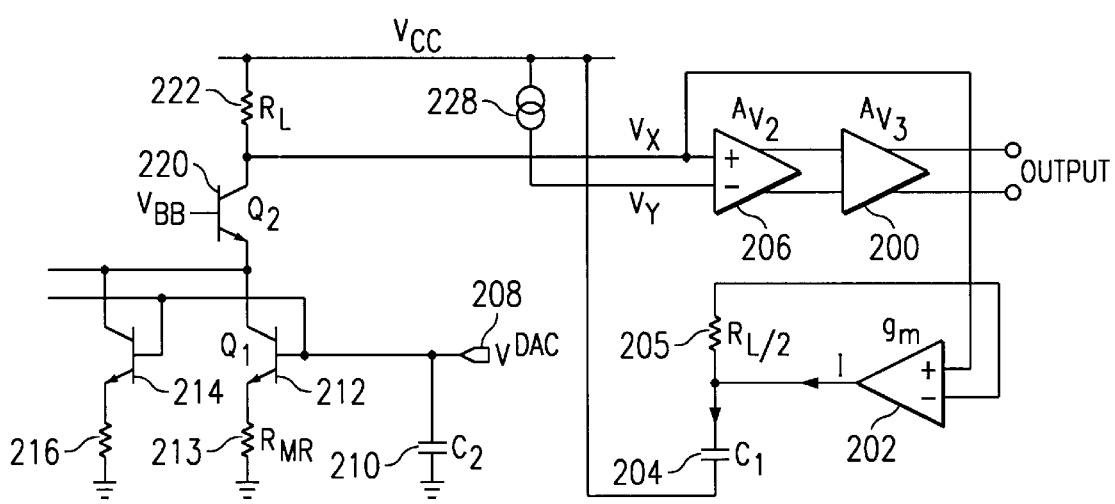
FIG. 2 illustrates another circuit of the present invention implementation.

Turning now to FIG. 2, which shows an additional implementation, FIG. 2 includes a voltage DAC circuit 208 directly coupled to a capacitor 210. Additionally, the output of the voltage DAC circuit 208 is coupled to the base of transistor 212. Resistance 213 or RMR is connected to the emitter of transistor 212. The collector of transistor 212 is connected to the emitter of transistor 220. The base of transistor 220 is connected to $V_{BB}$ bias voltage. The collector of transistor 220 is connected to resistor 222. Thus, the first stage of the read circuit is described.

Additionally, the transistor 214 is connected to another resistor 216 which is another head and consequently the connection to voltage DAC circuit 208 and transistor 220 represents a multiplexor for the first stage. The collector of transistor 202 is connected to the input of differential amplifier 206 and resistor 222. The output of the differential amplifier 206 is connected to differential amplifier 200. Additionally, the collector of transistor 220 is connected to the input of transconductance circuit 202. An additional input of transconductance circuit 202 is connected to resistor 225. The output of transconductance circuit 202 is connected to capacitor 204. Additionally, the capacitor 204 is connected to $V_{CC}$. In operation, the capacitor 210 takes the noise out of the signal output from the voltage DAC 208. The voltage DAC 208 outputs a voltage to the base of transistor 212, which causes operation of transistor 212 in the operating range of transistor 212. This voltage minus $V_{BE}$ of transistor 212 is input to the head, for example RMR, represented by resistance 213. The transistor 220 acts as a cascode transistor for transistor 212 and amplifies the signal received from the head. The gain of the first stage is determined by the ratio of resistance 222 to the resistance of 213. The signal received from the head is output from the collector of transistor 220 and input to the differential amplifier 206 as voltage $V_X$. The operation of transconductance circuit 202 is described next. If a voltage differs between the output of the emitter of transistor 220 and one end of resistance 205, the transconductance circuit 202 outputs a current to capacitor 204 which charges this capacitor 204 to a voltage on the capacitor 204. This voltage across the capacitor 204 raises the voltage across resistance 205 until it meets the voltage output from transistor 220. Once these two voltages are equal, the transconductance circuit 202 shuts off the output of current from the transconductance circuit 202, and the voltage across capacitor 204 remains the same. A constant current source 228 inputs a constant current to the differential amplifier 206 to cancel amplifiers base current. The output of differential amplifier 206 is input to the third stage of the read circuit, which includes differential amplifier 200. Thus, the voltage $V_Y$ is the voltage across the capacitor 204. The difference of $V_X$ and $V_Y$ is multiplied by the differential amplifier 206.

The gain and cutoff frequency is shown below:

Gain $$\text{gain} \cong \frac{R_{222}}{R_{213}} \cdot A_{v2} \cdot A_{v3}$$

Lower cutoff frequency—single pole $$V_{OUT} = A_{v3} A_{Y2}(V_X - V_Y) \quad [A]$$

$$V_Y = \frac{g_m(V_x - V_y)}{C_{204}} \rightarrow V_y C_{204} + g_m V_y = g_m V_x \quad [B]$$

$$\downarrow$$

$$V_y = \frac{g_m V_x}{C_{204} + g_m}$$

Using [A] & [B]

$$V_{OUT} = A_{v3} A_{v2} \left(1 - \frac{g_m}{C_{204} + g_m}\right) V_X$$

$$= A_{v3} A_{v2} \left(\frac{C_{204}}{C_{204} + g_m}\right) V_X$$

$$V_{OUT} = A_{v3} A_{v2} \left(\frac{1}{1 + \frac{g_m}{C_{204}}}\right) V_X \quad \text{Lower cutoff freg} = \frac{g_m}{C_{204}}$$

Noise $$\text{Noise} = \frac{R}{2g_{m1}} + \frac{R_{222}}{A_{v1}} + \frac{A_{v2} i/p \text{ noise}}{A_{v1}} + \frac{FeedbackLoopNoise}{A_{v1}}$$

Present invention reduces noise due to:
Feedback Loop Noise divided by $A_{v1}$

Figure 3:
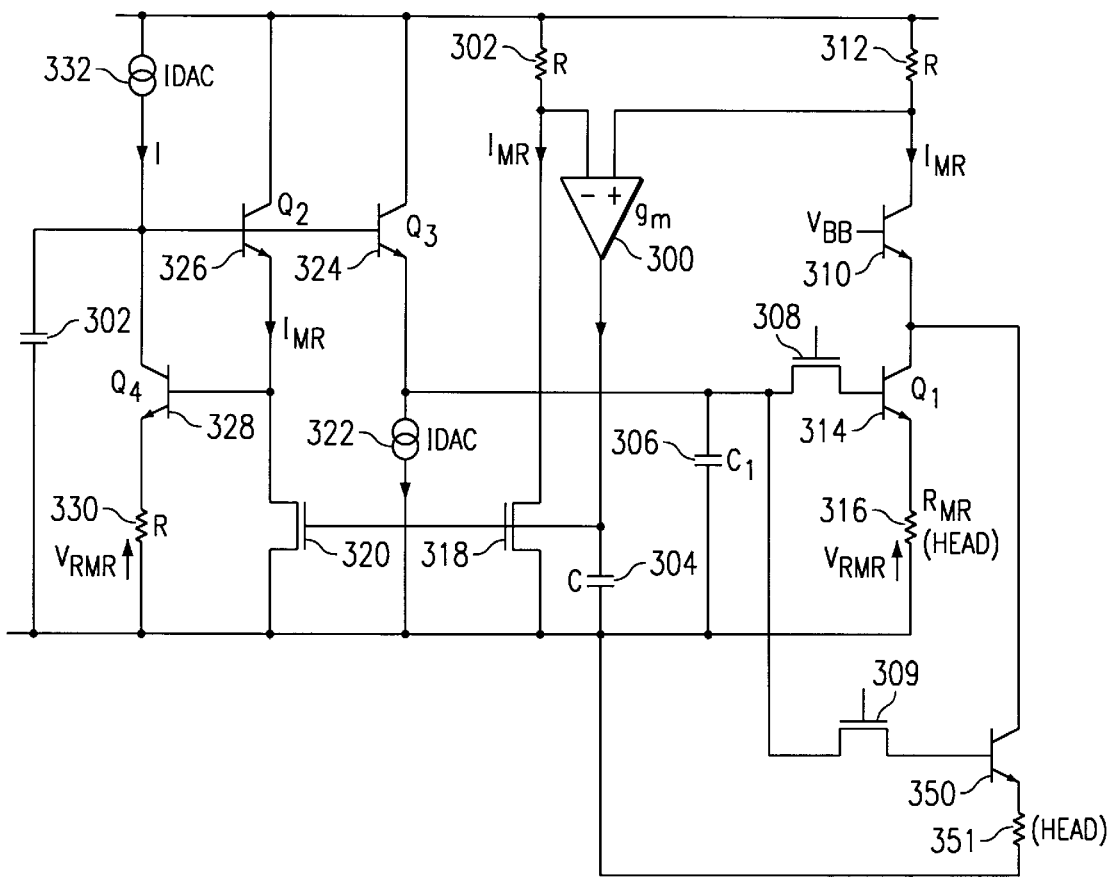
FIG. 3 illustrates a voltage DAC circuit.

Turning to FIG. 3, which illustrates a design of voltage DAC used for the implementation of FIG. 2, FIG. 3 illustrates a capacitor 301 connected between ground and the collector of transistor 328. The emitter of transistor 328 is connected to resistance 300. Additionally, the collector of transistor 328 is connected to constant current source 322. Constant current source 322 is additionally programmable so that a programed current can be input out of current source 322 through transistor 328 and through resistor 330.

Additionally, connected to the collector of transistor 328 is the base of transistor 326. The collector of transistor 326 is connected to voltage $V_{CC}$ while the emitter of transistor 326 is connected to the base of transistor 328. A FET transistor 320 is connected to the emitter of transistor 326. The drain of FET 320 is connected to the base of transistor 328 while the source of FET 320 is connected to ground. The gate of FET 320 is connected to the gate of FET 318. The base of transistor 326 is connected to the base of transistor 324. The collector of transistor 324 is connected to voltage $V_{CC}$ with the emitter of transistor 324 connected to constant current source 322. Constant current source 322 is an IDAC which allows the current output from the constant current source 322 to be programmed. The other end of constant current source 322 is connected to ground. The drain of FET 318 is connected to resistance 302. The other end of resistance 302 is connected to voltage $V_{CC}$. The source of FET 318 is connected to ground. The gate of transistor FET 318 is connected to capacitor 304. The other end of capacitor 304 is connected to ground. Additionally, the other end of capacitor 304 is connected to the output of transconductance circuit 300. The input to transconductance circuit 300 is connected to resistance 302 while the other input to transconductance 300 is connected to resistor 312. The other end of resistor 312 is connected to voltage $V_{CC}$. The input of transconductance 300 is additionally connected to a collector of transistor 310. The base of transistor 310 is connected to a constant bias voltage $V_{BB}$. The emitter of transistor 310 is connected to the collector of transistor 314. The emitter of transistor 314 is connected to resistor 316 which is the RMR resistance of MR head. Additionally, connected between the emitter of transistor 310 and the collector of transistor 314 is the collector of transistor 350 with the emitter of transistor 350 being connected to resistor 351 which is another head. The FET 309 is connected to the base of transistor 350 to act as a switch to switch resistor 351. The switch to control the resistor 316 of the MR head is FET 308. The drain of FET 308 is connected to the base of transistor 314, and the source of FET 308 is connected to the emitter of transistor 324. In operation, the IDAC 322 is programed to output a predetermined current and establishes this predetermined current through transistor 328 and through the resistor 330. The current through the resistor 330 causes a voltage drop $V_{RMR}$. The voltage at the base of transistor 328 is increased by $V_{BE}$. As a consequence, the transistor 328 is a step-up transistor. The base of transistor 328 is connected to the emitter of transistor 326. The base of transistor 326 is voltage $V_{BE}$ above the voltage of the emitter transistor 326. Thus, transistor 326 is a step-up transistor also. The voltage is applied to the base of transistor 324, and consequently the voltage output from the emitter of transistor 324 is stepped down by $V_{BE}$. The current through transistor 324 is determined by the constant current source 322. This current source 322 is programmable. The voltage applied to the emitter of transistor 314 is stepped down with respect to the voltage applied to the base of transistor 314, and consequently the voltage at the emitter of transistor 314 is less than the voltage applied to the base of transistor 314 by a voltage $V_{BE}$. The voltage at the emitter of transistor 314 is applied to the head, or as illustrated in FIG. 3, the head is represented by resistor 316. Transistor 310 is a cascode transistor of transistor 314 to amplify the signal read from the MR head or resistor 316. The transconductance circuit 300 detects a difference between the voltage at resistor 302 and the resistor 312. Whenever the voltage at resistor 312 is higher with respect to the voltage at resistor 302, a current is output from the transconductance circuit 300. This current is input to capacitor 304 which forms a voltage across capacitor 304. This voltage across capacitor 304 raises the voltage across the base of transistor 314, and consequently raises the emitter voltage of the transistor 314 and correspondingly the voltage applied to the resistor 316 of the MR head. As this voltage is raised, the voltage at the input of transconductance circuit 300 is also raised by raising the voltage of transistor 310. Once the voltage is raised to such a point that it equals the voltage at resistor 302, the current output from the transconductance circuit 300 ceases, and the voltage across capacitor 304 is maintained. In such a way, feedback is used to maintain the voltage across the resistor 316 of the MR head by making it equal to voltage across resistor 330.

Figure 4:
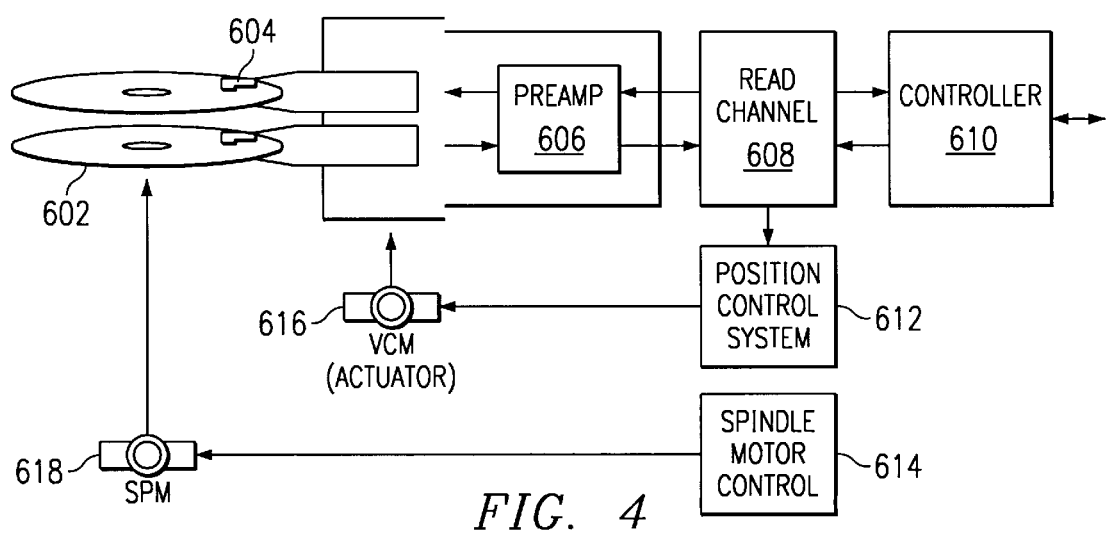
FIG. 4 illustrates a system diagram of the present invention.

FIG. 4 illustrates a system diagram of the present invention. Magnetic disk 602 is rotated by spindle motor 618. A head 604 reads and writes data transitions and reads servo transitions on the magnetic disk 602. The transitions are input to a preamplifier 606 which amplifies the signal from the head 604. The preamplifier 606 includes the read circuit of the present invention and is connected to read channel 608. The read circuit reads both data and servo transitions. The read channel 608 converts the analog pulses to digital pulses and obtains timing and position information from the recorded transitions. This information is transmitted to the position control system 612, which in turn controls the voice coil motor 616 to move the heads so that the heads are positioned at the desired track. The read channel 608 is connected to the controller 610 which prepares information to be placed on the bus as well as to interface with the host computer. Additionally, the spindle motor control 614 controls the spindle motor 618 to rotate the disk at a proper speed.

I claim:

1. A circuit for maintaining a constant voltage across a head; comprising:

a transconductance circuit to measure a difference voltage between a first voltage and a second voltage and to output a current based on said difference voltage;

a first circuit to convert said current based on said difference voltage to a third voltage; and a second circuit to apply a portion of said third voltage to said head.

2. A circuit for maintaining a constant voltage across a head, as in claim 1, wherein said second circuit completes a feedback loop.

3. A circuit for maintaining a constant voltage across a head, as in claim 1, wherein said first circuit is a capacitor.

4. A circuit for maintaining a constant voltage across a head, as in claim 1, wherein said first voltage is adjustable.

5. A circuit for maintaining a constant voltage across a head, as in claim 1, wherein said second voltage is said portion of said third voltage.

6. A circuit for maintaining a constant voltage across a head, comprising:

an adjustable voltage source to output an adjustable voltage; and a circuit to apply a portion of said adjustable voltage to said head.

7. A circuit for maintaining a constant voltage source across a head, comprising:

a constant current source for providing a constant current;

a conversion circuit for connecting said constant current to a voltage to be applied to the head;

a transconductance current for obtaining a difference voltage between a first voltage and a second voltage and outputting an output current based on said difference voltage between said first voltage and said second voltage; and a circuit to adjust said voltage to be applied to said head by converting said output current to a second voltage.

8. A circuit for maintaining a constant voltage across a head, as in claim 1, wherein said circuit for maintaining a constant voltage further comprises a circuit to establish a lower corner frequency response.

9. A circuit for maintaining a constant voltage across a head, as in claim 6, wherein said circuit for maintaining a constant voltage further comprises a circuit to establish a lower corner frequency response.

* * * * *

UNITED STATES PATENT AND TRADEMARK OFFICE
CERTIFICATE OF CORRECTION

PATENT NO.    : 6,060,872
DATED         : May 9, 2000
INVENTOR(S)   : Indumini W. Ranmuthu Page 1 of 1

It is certified that error appears in the above-identified patent and that said Letters Patent is hereby corrected as shown below:

<u>Title Page:</u>
Please insert the following after "Related U.S. Application Data":

Provisional application No. 60/084,458 May 6, 1998.

Signed and Sealed this

Nineteenth Day of June, 2001

Attest:

Attesting Officer

NICHOLAS P. GODICI
*Acting Director of the United States Patent and Trademark Office*